United States Patent
Behr et al.

(10) Patent No.: US 8,484,962 B2
(45) Date of Patent: Jul. 16, 2013

(54) SYSTEM AND METHOD FOR THE TEMPERATURE REGULATION OF A HYDRAULIC FLUID

(75) Inventors: Robert Behr, Trittau (DE); Jurgen Laude, Bremen (DE); Rolf Gossing, Bremen (DE); Sebastian Lauckner, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 816 days.

(21) Appl. No.: 12/443,760

(22) PCT Filed: Jun. 19, 2008

(86) PCT No.: PCT/EP2008/057741
§ 371 (c)(1),
(2), (4) Date: Nov. 23, 2009

(87) PCT Pub. No.: WO2009/000731
PCT Pub. Date: Dec. 31, 2008

(65) Prior Publication Data
US 2010/0170238 A1    Jul. 8, 2010

Related U.S. Application Data

(60) Provisional application No. 60/945,639, filed on Jun. 22, 2007.

(30) Foreign Application Priority Data

Jun. 22, 2007  (DE) .......................... 10 2007 028 919

(51) Int. Cl.
*F15B 21/04*     (2006.01)
*B64C 13/40*     (2006.01)

(52) U.S. Cl.
USPC .............................. 60/456; 60/329; 244/99.5

(58) Field of Classification Search
USPC ..................... 60/329, 456, 459; 244/99.5, 226
See application file for complete search history.

(56) References Cited

U.S. PATENT DOCUMENTS

| 2,538,606 | A |   | 1/1951  | Udale   |        |
|-----------|---|---|---------|---------|--------|
| 2,764,147 | A | * | 9/1956  | Brunner | 60/456 |
| 3,699,847 | A | * | 10/1972 | Little  | 60/456 |
| 3,772,896 | A |   | 11/1973 | Rao     |        |

(Continued)

FOREIGN PATENT DOCUMENTS

| DE | 102005024743 | 9/2006  |
|----|--------------|---------|
| EP | 1 164 298    | 12/2001 |
| RU | 2111895      | 5/1998  |

*Primary Examiner* — Thomas E Lazo
(74) *Attorney, Agent, or Firm* — Occhiuti Rohlicek & Tsao LLP (57) ABSTRACT

The invention relates to a system for regulating a temperature of hydraulic fluid in at least one hydraulic circuit of an aircraft, wherein, in a periphery of the aircraft, additional hydraulic consumption units are each provided with at least one controllable valve for heating the hydraulic fluid above an adjustable minimum temperature limit value ($T_{min}$), wherein the controllable valve is closed during a maneuver of the aircraft, wherein the controllable valves of the additional hydraulic consumption units are closed when the temperature of the hydraulic fluid exceeds an adjustable theoretical temperature value ($T_{soll}$), and wherein a temperature control system is connected to a temperature sensor for adjusting the controllable valve on the basis of a local temperature of the hydraulic fluid, the temperature sensor being near the hydraulic consumption units which are arranged in wings and tail of the aircraft.

11 Claims, 6 Drawing Sheets

U.S. PATENT DOCUMENTS

| | | |
|---|---|---|
| 4,277,020 A | 7/1981 | Grenier |
| 4,344,567 A | 8/1982 | Horne et al. |
| 4,373,869 A * | 2/1983 | Martin et al. ............... 60/329 |
| 5,109,672 A * | 5/1992 | Chenoweth et al. ............ 60/456 |
| 6,397,590 B1 * | 6/2002 | Hart ............................... 60/329 |
| 7,165,950 B2 * | 1/2007 | Fenny et al. .................... 60/468 |
| 7,946,506 B2 * | 5/2011 | Zagni et al. ............... 236/101 R |
| 2006/0021340 A1 | 2/2006 | Vigholm et al. |

* cited by examiner

SYSTEM AND METHOD FOR THE TEMPERATURE REGULATION OF A HYDRAULIC FLUID

CROSS-REFERENCE TO RELATED APPLICATIONS

This application is the National Stage of International Application No. PCT/EP2008/057741, filed Jun. 19, 2008, which claims priority to German Application No. 102007028919.9, filed Jun. 22, 2007 and U.S. Application No. 60/945,639, filed Jun. 22, 2007. The contents of these applications are hereby incorporated by reference in their entirety.

The invention relates to a device for the temperature regulation of hydraulic fluid in at least one hydraulic circuit of an aircraft.

In an aircraft different components, for example the rudder and valves, are hydraulically controlled. In an aircraft a plurality of hydraulic circuits, which supply different consumers, can be provided in an aircraft for reasons of redundancy. The hydraulic pressure is generated by pumps. The hydraulic consumers are generally connected to the pumps by a partially widely branched pipe network.

The hydraulic fluid present in the hydraulic pipes of the different hydraulic circuits consists of hydraulic oil, for example. However, environmentally compatible fluids, water for example, can also be used. The hydraulic fluid has a viscosity which depends on the operating temperature T of the hydraulic fluid. The viscosity is a measure of the thickness of a hydraulic fluid. The higher the viscosity of the hydraulic fluid the thicker it is, and conversely, the lower the viscosity of the hydraulic fluid the thinner it is. As the temperature increases, so the viscosity or thickness of the hydraulic fluid decreases. Moreover, acid is formed in the hydraulic fluid as the temperature increases, and this acid is then present even at low temperatures. The fluid is therefore chemically more aggressive and mechanically attacks components such as pumps or hydraulic pipes, for example.

Figure 1:
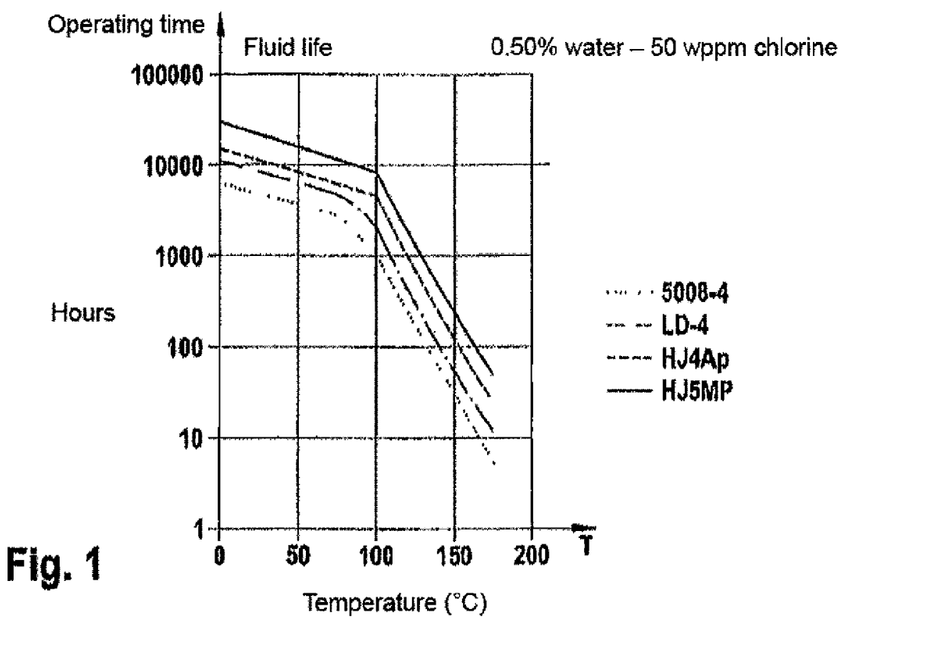
FIG. 1: shows a graph for representing the operating time of a hydraulic fluid as a function of the temperature of the hydraulic fluid.

The remaining life of the hydraulic fluid present in a hydraulic circuit decreases substantially from a temperature of over 100° C., as illustrated in FIG. 1. The possible operating time or life of the hydraulic fluid is reduced exponentially at higher temperatures. Furthermore, chemical aggressiveness or activity attains such a high level, when remaining at a long time at high temperatures, so that all the hydraulic fluid inside the hydraulic circuit must be replaced. Even a small quantity of contaminated or highly aggressive hydraulic fluid results in general ageing of all the hydraulic fluid present in the hydraulic circuit within a relatively short period of time. In addition to a high operating temperature a high proportion of water also results in faster ageing of the hydraulic fluid present in the hydraulic circuit. As far as system reliability is concerned, the temperature of the hydraulic fluid is one of the most critical parameters in terms of maximum life of the pumps in a hydraulic circuit.

In a conventional hydraulic system for aircraft heat exchangers are therefore used, according to the state of the art, to maintain the temperature of the hydraulic fluids below a temperature limit value of 95° C., for example.

In normal operation, particularly in flight operation, such high fluid temperatures are rarely reached because the outside temperature is relatively low, particularly at higher layers of air.

Figure 2:
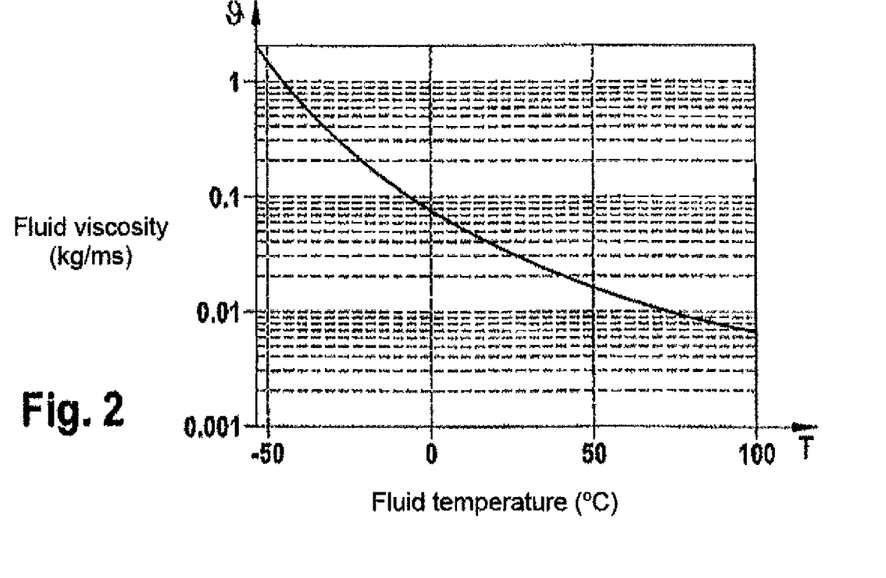
FIG. 2: shows a graph for representing the viscosity of a hydraulic fluid as a function of the temperature of the hydraulic fluid according to the state of the art.

The lower the temperature of the hydraulic fluid, the higher the viscosity or thickness of the hydraulic fluid. FIG. 2 illustrates the relationship between a viscosity θ of the hydraulic fluid and temperature T of the hydraulic fluid. As can be seen from the graph in FIG. 21, viscosity θ of the hydraulic fluid decreases as temperature T of the hydraulic fluid increases. At a temperature T of approximately −15° C., viscosity θ of the hydraulic fluid is relatively high.

The pressure decrease Δp in a hydraulic pipe is dependent on the volumetric flow through the pipe, the inside diameter, length and viscosity θ of the fluid. In this case the volumetric flow, viscosity and length are directly proportional to the pressure decrease, i.e. the greater one of these parameters is, the greater will be the pressure decrease. An indirectly proportional behaviour, i.e. the smaller the inside diameter the greater the pressure decrease, applies to the inside diameter.

In conventional hydraulic systems of aircraft the diameter of hydraulic pipes is chosen sufficiently high to be able to still provide sufficient pressure for supplying energy to the hydraulic components, for example the elevator or vertical rudder, even at a relatively high pressure decrease due to high viscosity in a cold hydraulic fluid. However, the greater the diameter d of the hydraulic pressure pipes, the more hydraulic fluid is present in the hydraulic pressure pipes and the greater the weight of the pipes and the hydraulic fluid present in the hydraulic circuit also. The total weight of the aircraft is therefore also increased.

The object of the present invention is therefore to provide a device and a method in which hydraulically operated components of the aircraft can be reliably actuated even by means of hydraulic pipes of small diameter.

The invention provides a device and a method for regulating a temperature of hydraulic fluid in at least one hydraulic circuit of an aircraft, the temperature of the hydraulic fluid being adjustable to such an extent that it exceeds an adjustable minimum temperature limit value.

In an embodiment of the inventive device additional hydraulic consumption units, located in the periphery of the aircraft, are used to heat the hydraulic fluid.

The advantage of this embodiment is that only system-immanent energy need be supplied to heat the hydraulic fluid since the hydraulic fluid is heated by inner friction. The use of hydraulic consumption units for heating the hydraulic fluid is also extremely reliable.

The heating of the hydraulic fluid above an adjustable minimum temperature limit value results in a situation where the pressure loss on the hydraulic pipes of the hydraulic circuit is reduced or, with a constant pressure loss, hydraulic pipes with a smaller diameter can also be used. Due to the smaller diameter the volume of the hydraulic fluid present in the hydraulic circuit, and hence also its total weight, is lower. This leads in turn to a lower fuel consumption of the lighter aircraft.

Preferred embodiments of the inventive device and inventive method for regulating a temperature of the hydraulic fluid in at least one hydraulic circuit of an aircraft are described in the following with reference to the attached figures to explain the features essential to the invention.

Figure 3:
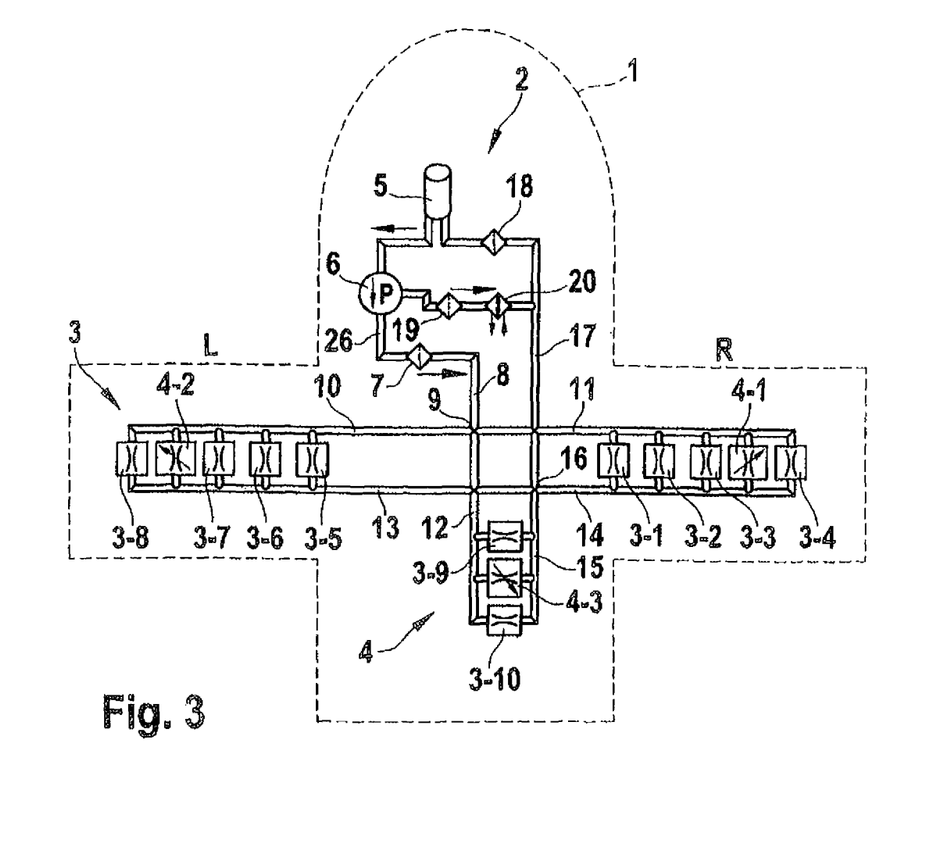
FIG. 3: shows a possible exemplary embodiment for a hydraulic circuit inside an aircraft in which the inventive device is used for regulating a temperature of hydraulic fluid.

As can be seen in FIG. 3, at least one hydraulic circuit 2 is installed inside an aircraft 1 whose outer walls are represented by dotted lines. Hydraulic circuit 2 is provided for the hydraulic actuation of hydraulic components inside aircraft 1. For example, hydraulic circuit 2 serves to control valves for retracting and lowering the undercarriage. Ailerons at the rear end of the wing, elevators at the rear end of aircraft 1, vertical rudders and spoilers, for example, constitute further controllable components of aircraft 1. The spoilers serve to limit the speed in vertical descent and reduce lift. The ailerons at the outer end of the wings control banking i.e. the rotation of the aircraft about the longitudinal axis (so-called rolling). The elevators regulate the longitudinal inclination of the aircraft about the transverse axis, which is also described as pitching or spinning, by varying the pitch. The vertical rudders serve for vertical control about the normal axis, which is also referred to as yawing. Due to the mechanically or hydraulically controlled components the aircraft can rotate simultaneously about one or more axes. All these hydraulic components form hydraulic consumption units.

The hydraulic consumption units used to control the movement of aircraft 1 are shown in FIG. 3 as throttles 3. In the exemplary embodiment shown in FIG. 3, hydraulic consumption units 3 are installed in the right wing R and in the left wing L of aircraft 1. In the example shown in FIG. 3, four hydraulic consumption units 3-1, 3-2, 3-3, 3-4 are provided in the right wing R of aircraft 1. For example, four hydraulic consumption units for movement control 3-5, 3-6, 3-7, 3-8 are also provided in the left wing L of aircraft 1. Hydraulic consumption units 3-1 to 3-8 provided in the wings may, for example, be spoilers. Furthermore, further mechanical consumption units 3-9, 3-10 can be provided in the tail of aircraft 1 in the exemplary embodiment shown in FIG. 3.

In the inventive hydraulic system additional hydraulic consumption units 4, which are used to heat the hydraulic fluid present in hydraulic circuit 2, are provided in one embodiment in addition to normal hydraulic consumption units 3-*i* for controlling the movement of aircraft 1. These additional consumption units 4 are located, for example, in the periphery of aircraft 1. In the exemplary embodiment shown in FIG. 3, an additional hydraulic consumption unit 4-1 is provided in ring wing R, an additional hydraulic consumption 4-2 is provided in left wing L, and a third hydraulic consumption unit 4-3 is provided in the rail of aircraft 1. Alternatively, a centrally installed additional hydraulic consumption unit 4 may also be provided for heating the hydraulic fluid. In addition to hydraulic consumption units 3, 4, hydraulic circuit 2 has a hydraulic reservoir or storage tank 5 for the hydraulic fluid. The hydraulic fluid present in storage tank 5 has a pressure of five bars, for example. A pump 6, which is driven by a motor or by a drive, for example, sucks in the hydraulic fluid present in reservoir 5 and conveys it at a very high pressure through a feed pipe to a filter 7. From filter 7 the hydraulic fluid is fed at high pressure through a pipe 8 to a distributor or manifold 9. On distributor 9 the hydraulic fluid has a very high pressure P of over 200 bars. From distributor 9 the hydraulic field is fed through pipes 10, 11 to hydraulic consumption units 3, 4 present in the wings. In addition, the hydraulic pressure, which is under high pressure, is fed into the tail of aircraft 1 through a pipe 12.

The hydraulic fluid flows through return pipes 13, 14 back into reservoir 5. A drop in pressure is again recorded in the pipes. Since reservoir 5 has a constant pressure, the pressure on the outlet side of hydraulic consumption units 3, 4 must be higher than the reservoir pressure. The differential pressure between the feed and return pipes to the consumption units is therefore available to hydraulic consumption units 3, 4.

The hydraulic fluid, which is under a relatively low pressure of approximately five bars, is in this case accumulated at a collection point 16 and returned to reservoir 5 via a hydraulic pipe 17 and a filter 18. In pump 6 a leakage flow is generated which is guided through a filter 19 into a heat exchanger 20. Whilst the hydraulic fluid discharged from pump 6 into pipe 7 has a temperature of 60° C., for example, the temperature of the pump leakage flow is higher and is at 70° C., for example. The pump leakage flow is fed back into reservoir 5 from heat exchanger 20 through filter 18.

As can be seen from the exemplary embodiment shown in FIG. 3, additional hydraulic consumption units 4-1, 4-2, 4-3 are used to heat the hydraulic fluid in hydraulic circuit 2 if necessary, so that temperature T of the hydraulic fluid is always above a minimum temperature limit value. These hydraulic consumption units 4 are located in the periphery of aircraft 1, i.e. preferably in the wings and in the tail of aircraft 1. In the exemplary embodiment shown in FIG. 3 the heating is generated by inner friction of the fluid in the additional hydraulic consumption units 4. As can be seen from FIG. 3, hydraulic consumption units 4 are located, for example, at the points on aircraft 1 which are substantially cooled by the ambient temperature. The ambient temperature $T_{außen}$ is normally approximately −40° C. to 55° C. when the aircraft is on the ground, and may drop to below −80° C. during a flight.

Figure 4:
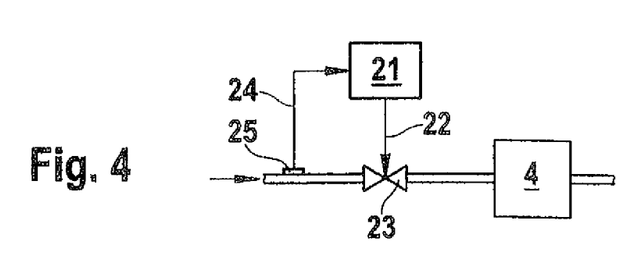
FIG. 4: shows an exemplary embodiment for the inventive device for regulating a temperature of a hydraulic fluid in a hydraulic circuit of an aircraft.

FIG. 4 shows the activation of a hydraulic consumption unit 4 in an exemplary embodiment of the inventive device. In this exemplary embodiment a local temperature control system 21 is provided which activates a controllable valve 23 by means of a control cable 22. Controllable valve 23 is located near the hydraulic consumption unit 4 to heat the hydraulic fluid on the high pressure side of hydraulic circuit 2. In the embodiment shown in FIG. 4 the local temperature control system 21 is connected by a cable 24 to a temperature sensor 25, which records the local temperature T of the hydraulic fluid.

In the inventive device controllable valve 23 of hydraulic consumption unit 4 is opened by the local temperature control 21 of the hydraulic fluid in the hydraulic circuit when temperature T of the hydraulic fluid recorded by temperature sensor 25 drops below a minimum temperature limit value. Here the minimum temperature limit value is adjustable. In a possible embodiment the minimum temperature limit value $T_{min}$ is set to a value of approximately 20° C. This minimum temperature limit value $T_{min}$ is particularly suitable for the hydraulic fluid phosphate ester. For other hydraulic fluids the minimum temperature limit value $T_{min}$ can be set to other values.

In a possible embodiment controllable valve 23 is closed by local temperature control 21 when temperature T of the hydraulic fluid exceeds an adjustable theoretical temperature value $T_{soll}$ of 35° C., for example.

Figure 5:
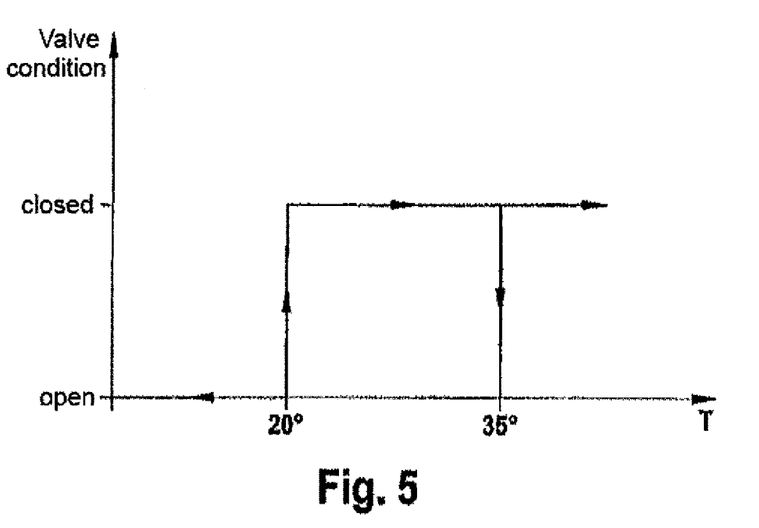
FIG. 5: shows a graph of a connection characteristic for a controllable valve such as that used in the inventive device according to FIG. 4.

In a possible embodiment controllable valve 23 is activated by temperature control 21 according to the graph in FIG. 5, i.e. the activation characteristic has a hysteresis. With the hysteresis a frequent switching of controllable valve 23 on and off is prevented.

The exemplary embodiment shown in FIG. 4 represents a decentralised temperature control 21. In an alternative embodiment the different controllable valves 23 are activated for the additional hydraulic consumption units 4 by a central control system which is located, for example, in a cockpit of aircraft 1.

Figure 6:
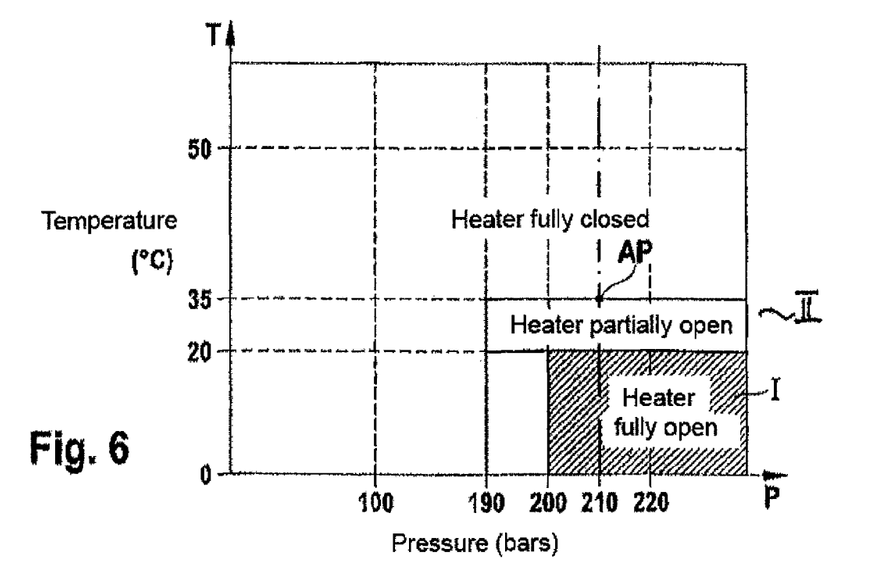
FIG. 6: shows a graph for illustrating the mode of operation of the inventive device for regulating a temperature of hydraulic fluid in a hydraulic circuit of an aircraft.

FIG. 6 is a graph representing a possible embodiment of the inventive device for temperature regulation.

In a possible embodiment pressure P from hydraulic pump 6 is approximately 210 bars on the high pressure side of hydraulic circuit 2. Hydraulic circuit 2 shown in FIG. 3 is a constant pressure circuit. The optimum working point AP for the temperature of the hydraulic fluid is approximately 35° C. As soon as temperature T of the hydraulic fluid drops below 20° C., controllable valves 23 of hydraulic consumption units 4 are fully opened in a region I, so that the hydraulic fluid in hydraulic circuit 2 is heated because of the inner friction. In a transitional range between 20° C. and 35° C., controllable valves 23 are partially opened, as denoted by region II. At temperatures T above 35° C., controllable valves 23 in hydraulic consumption units 4 are fully closed.

In a possible embodiment controllable valves 23 of additional consumption unit 4, which are provided exclusively for heating the hydraulic fluid, are closed during a flying manoeuvre of aircraft 1. For example, controllable valves 23 are closed in a takeoff and landing phase of aircraft 1. In a possible embodiment the decentralised temperature control systems 21 are connected by control cables to a central control system inside the cockpit. During the takeoff and landing phases controllable valves 23 are fully closed by the central control system. This ensures that a sufficient working pressure is always provided for hydraulic consumer units 3 for flight movement control at all times during a flying manoeuvre. Excessive heating of the hydraulic fluid and the consequent increase in volumetric flow might otherwise cause the pressure inside the hydraulic system to be insufficient for the remaining hydraulic consumption unit 3.

In a possible embedment the control system detects a fall in pressure in hydraulic circuit 2. If there is a fall in pressure the control system then closes controllable valves 23 of hydraulic consumption units 4 to stabilise the pressure in the feed pipe. In this embodiment control system 21, as shown in FIG. 4, is additionally connected to a pressure sensor for measuring the pressure inside the hydraulic pipe. If the control system receives signals regarding pressure P and temperature T of the hydraulic fluid, a regulation takes place so that working point AP, as shown in the graph in FIG. 5, is reached.

Heat exchanger 20 shown in FIG. 3 ensures that operating temperature T of the hydraulic fluid does not exceed an upper temperature limit value. The adjustable maximum temperature limit value $T_{max}$ is set to approximately 70° C., for example. Heat exchanger 20 cools the hydraulic fluid down so that temperature T of the hydraulic fluid does not exceed this adjustable maximum temperature limit value $T_{max}$ of approximately 70° C.

In a possible embodiment the maximum temperature limit value $T_{max}$ of the theoretical temperature value $T_{soll}$ and the minimum temperature limit value $T_{min}$ are configured by a central control system. In a possible embodiment these temperature values are configured as a function of a measured outside temperature $T_{außen}$.

In hydraulic circuit 2 hydraulic pipes with a relatively small diameter may be used. The following equation shows the relationship between pressure reduction $\Delta \rho$ and the temperature-dependent viscosity ν of the hydraulic fluid.

$$\Delta \rho = \frac{128}{\pi} \cdot \frac{1}{d^4} \cdot \eta \cdot \rho \dot{v}$$

where l is the length of the pressure pipe,
d is the diameter of the pressure pipe,
η is the temperature-dependent viscosity of the hydraulic fluid,
ρ is the density of the hydraulic fluid, and
V is the volumetric flow of the hydraulic fluid.

Since in the inventive device viscosity η of the hydraulic fluid is always relatively low because of the temperature regulation, diameter d of the hydraulic pipes can be chosen relatively small without this resulting in too great a pressure decrease ΔP through the hydraulic pressure pipe. Correspondingly less hydraulic fluid is present in these thin hydraulic pressure pipes so that the time for the heating phase is also relatively short because of the inventive temperature regulation.

The relatively low upper maximum temperature limit value $T_{max}$ of approximately 70° C. also leads to a situation where the hydraulic fluid present in the hydraulic circuit has a relatively long operating time, so that an exchange of hydraulic fluid must take place within relatively long intervals of time.

The hydraulic fluid is heated in an alternative embodiment by heating elements. In this case the heating system heats the hydraulic fluid when temperature T of the hydraulic fluid lies below the minimum temperature limit value $T_{min}$ of 20° C., for example.

The invention claimed is:

1. A system for regulating a temperature of hydraulic fluid in at least one hydraulic circuit of an aircraft, wherein, in a periphery of the aircraft, additional hydraulic consumption units are each provided with at least one controllable valve for heating the hydraulic fluid above an adjustable minimum temperature limit value ($T_{min}$), wherein the controllable valve is closed during a maneuver of the aircraft, wherein the controllable valves of the additional hydraulic consumption units are closed when the temperature of the hydraulic fluid exceeds an adjustable theoretical temperature value ($T_{soll}$), and wherein a temperature control system is connected to a temperature sensor for adjusting the controllable valve on the basis of a local temperature of the hydraulic fluid, the temperature sensor being near the hydraulic consumption units, which are arranged in wings and tail of the aircraft.

2. The system according to claim 1, wherein the minimum temperature limit value ($T_{min}$) is set to approximately 20° C.

3. The system according to claim 1, wherein the valves of the additional hydraulic consumption units are each controllable by the temperature control system, which is arranged centrally or locally with respect to the aircraft.

4. The system according to claim 1, wherein the theoretical temperature value ($T_{soll}$) is set to approximately 35° C.

5. The system according to claim 1, wherein at least one heat exchanger is provided which cools the hydraulic fluid so that the temperature of the hydraulic fluid does not exceed an adjustable maximum temperature limit value ($T_{max}$).

6. The system according to claim 5, wherein the maximum temperature limit value ($T_{max}$) is set to approximately 70° C.

7. The system according to claim 1, wherein at least one controllable heating is provided in the hydraulic circuit for heating the hydraulic fluid.

8. The system according to claim 7, wherein the heating system heats the hydraulic fluid when the temperature of the hydraulic fluid is below the minimum temperature limit value ($T_{min}$).

9. A method for regulating a temperature of hydraulic fluid in at least one hydraulic circuit of an aircraft, wherein controllable valves of hydraulic consumption units are opened by a temperature control system for heating the hydraulic fluid when the temperature of the hydraulic fluid is below an adjustable minimum temperature limit value ($T_{min}$), wherein the controllable valves are closed during a maneuver of the aircraft, wherein the controllable valves of the hydraulic consumption units are closed when the temperature of the hydraulic fluid exceeds an adjustable theoretical temperature value ($T_{soll}$), and wherein a temperature control system is connected to a temperature sensor for adjusting the controllable valve on the basis of a local temperature of the hydraulic fluid the temperature sensor being near the hydraulic consumption units which are arranged in wings and tail of the aircraft.

10. The method according to claim 9, wherein a heat exchanger cools the hydraulic fluid so that the temperature of the hydraulic fluid does not exceed an adjustable maximum temperature limit value ($T_{max}$).

11. The method according to claim 10, wherein a heating system heats the hydraulic fluid when the temperature of the hydraulic fluid is below the minimum temperature limit value ($T_{min}$).

\* \* \* \* \*